May 29, 1951 — A. SCHOENWALD — 2,554,926
ELECTRIC SOLDERING IRON
Filed Oct. 5, 1948 — 2 Sheets-Sheet 1
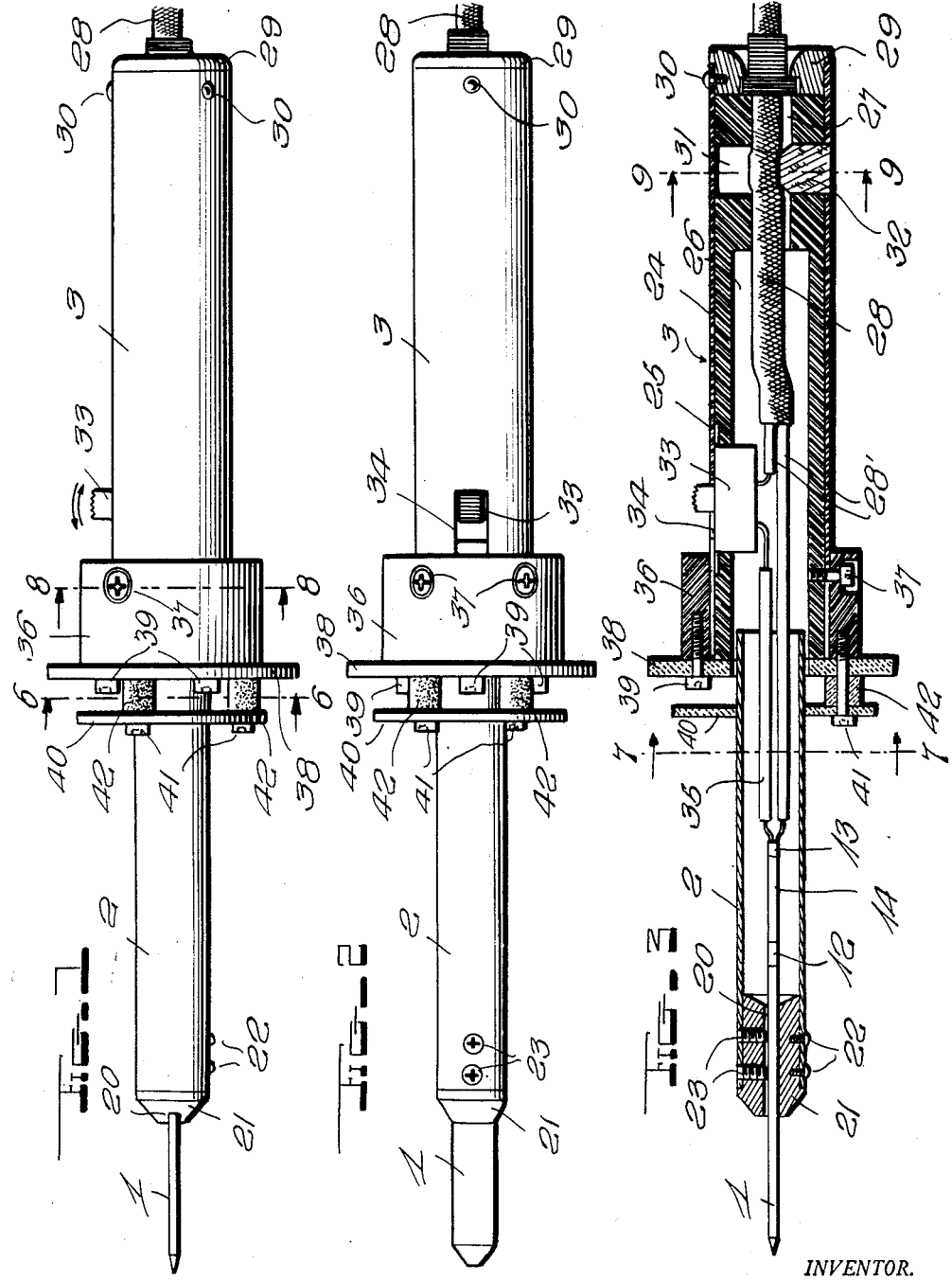
INVENTOR.
ALEXANDER SCHOENWALD,
BY Jacobi & Jacobi
ATTORNEYS May 29, 1951 A. SCHOENWALD 2,554,926
ELECTRIC SOLDERING IRON
Filed Oct. 5, 1948 2 Sheets-Sheet 2
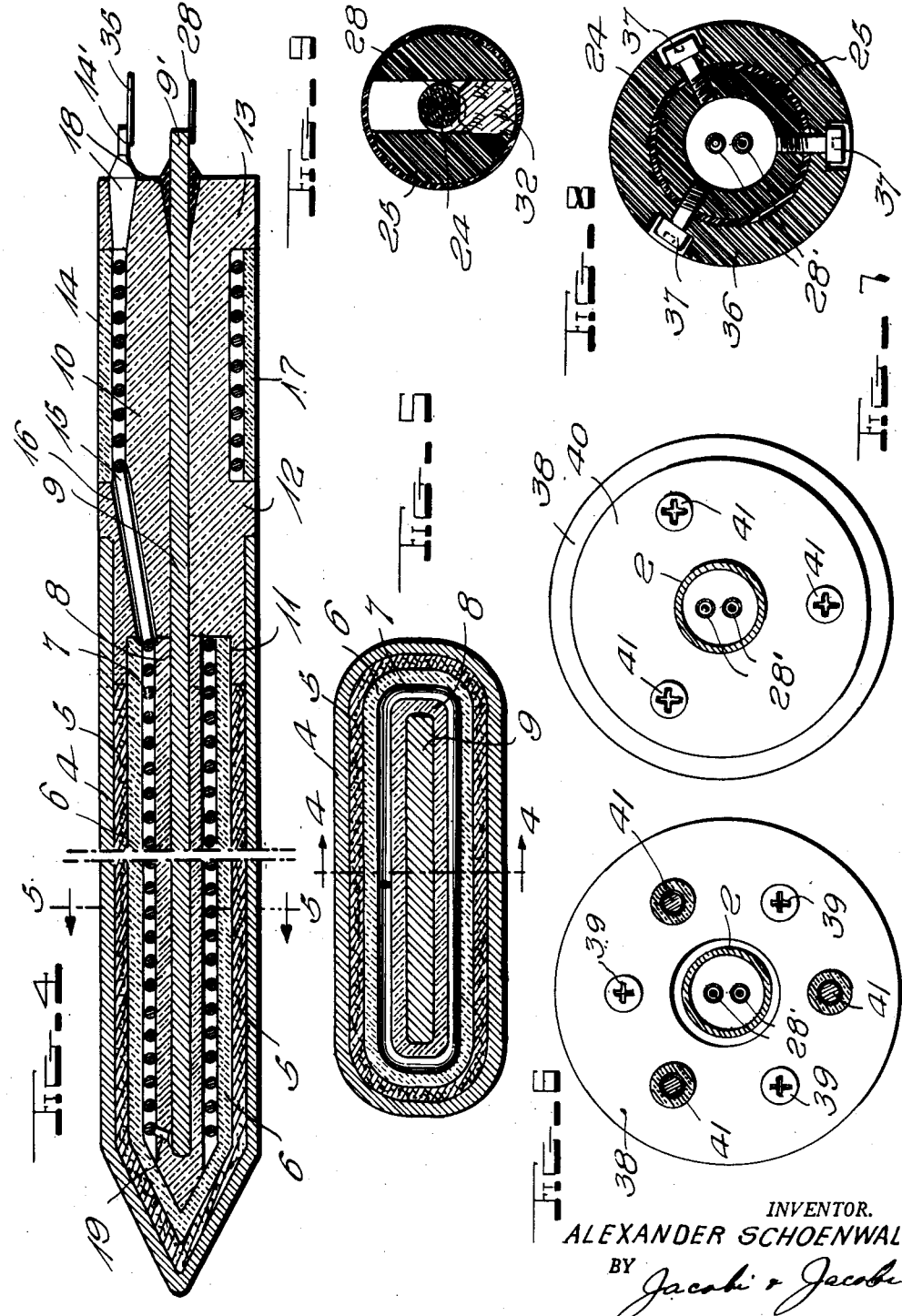
INVENTOR.
ALEXANDER SCHOENWALD,
BY Jacobi & Jacobi
ATTORNEYS Patented May 29, 1951

2,554,926

UNITED STATES PATENT OFFICE 2,554,926

ELECTRIC SOLDERING IRON

Alexander Schoenwald, Binghamton, N. Y., assignor to Instant Tool Corporation, a corporation of New York Application October 5, 1948, Serial No. 52,907

2 Claims. (Cl. 219—26)

This invention relates to an electrically heated device and while the invention is particularly adaptable in construction of electric soldering irons, it will be understood that it is not restricted to such a device but may be incorporated in the construction of any device which is heated through the medium of a current of electricity passed through a resistance coil.

One object of the invention is to provide an electrically heated soldering iron or equivalent device formed of special materials and of such construction that it will be quickly heated to a desired temperature for use and maintained at such temperature with a minimum amount of current.

Another object of the invention is to provide a soldering iron having an improved tip heated by current flowing through front and rear coils, one being formed of a high resistance metal having a lower thermal co-efficient than the second which has a high temperature co-efficient but a lower heat resistance and thus obtain at the start a high impact heating power and materially reduce the heating-up time.

Another object of the invention is to provide a soldering iron formed of such materials that it will have a high stability against oxidation at high temperatures and also have good resistance to chemical corrosions often caused by fluxing when soldering irons of conventional formation are used.

Another object of the invention is to provide a soldering iron of such construction that flow of heat to its handle will be effectively resisted and overheating of the handle thus avoided.

Another object of the invention is to provide an electric soldering iron which is of simple and compact construction and is provided with a switch by means of which flow of current through its coils may be shut off when so desired.

The invention is illustrated in the accompanying drawings wherein:

Figure 1 is a side elevation of the improved soldering iron.

Figure 2 is a view looking down upon Figure 1.

Figure 3 is a sectional view taken longitudinally through the improved soldering iron.

Figure 4 is a sectional view upon an enlarged scale taken longitudinally through the tip of the soldering iron upon the line 4—4 of Figure 5.

Figure 5 is a sectional view taken transversely through the tip upon the line 5—5 of Figure 4.

Figure 6 is a transverse sectional view taken along the line 6—6 of Figure 1.

Figure 7 is a transverse sectional view taken along the line 7—7 of Figure 3.

Figure 8 is a transverse sectional view taken along the line 8—8 of Figure 1.

Figure 9 is a transverse sectional view taken along the line 9—9 of Figure 3.

This improved soldering iron has a tip 1, a tubular tip holder 2, and a handle 3. The tip is of a flat blade-like formation, as shown in Figures 1 and 2, so that solder may be applied in narrow crevices and has a shell 4 which is formed of an active metal and is preferably nickel or its alloys. Within the shell is a lining or temperature adjuster 5 formed of metal or other suitable material having higher heat conductivity properties than the metal from which the shell is formed. The metal from which the lining is formed is normally solid but will be liquefied when subjected to predetermined temperature in order to make use of its fusion heat and its resultant raised heat conductivity. The next layer 6 is formed of mica, magnesium oxide, or other suitable insulating material having high heat resistant properties. The sleeve 6 encloses a heating coil 7 formed of resistance wire having low temperature co-efficiency and this heating unit is coiled about a core 8 which is formed of high heat resistance insulating material and extends longitudinally in the pocket defined by the sleeve 6 and has a tapered front end. This core is hollow and into it fits the forward portion of an electrode 9 which passes longitudinally through a bore formed centrally of a body 10 of insulating material such as ceramic, sintered mica, magnesium oxide and the like having high heat resistance qualities. The rear end of the sleeve 6 fits into a pocket 11 formed in the front end of the body 10 and the rear portion of the shell 4 projects beyond the rear end of the sleeve and fits snugly about the body with its rear end abutting an annular shoulder 12 extending about the body circumferentially thereof.

About the rear end of the body is formed a circumferentially extending shoulder 13 and about the portion of the body between the shoulders 12 and 13 is a second coil 14 formed of resistance wire having high temperature co-efficiency and connected in series with the coil 7 by a connection 15 which passed through an opening 16 extending longitudinally through the body at the incline shown in Figure 4. A sleeve 17 of insulation surrounds the coil 14 and in order to prevent rear portions of the resistance wire and the electrode from slipping longitudinally and to form tight joints about them there has been provided packing 18 formed of heat resistant cement. It should be noted that extremities of the electrode 9 and the wire forming the coil 14 protrude from the cement 18 and form terminals 9' and 14' and that the front end 19 of the wire forming the coil 7 passes through a side opening formed in the sleeve 6 and is attached to the front end of the electrode 9. The tip 1 is passed longitudinally through the centrally located bore 20 of a metal block 21 which is mounted in the forward portion of the tip holder 2 and secured by screws 22. Set screws 23 which are threaded through the block firmly hold the tip against longitudinal movement out of a set position and ends of these set screws are exposed through openings in the tip holder so that they may be tightened and also loosened when necessary.

The handle 3 has a body 24 formed of wood or other suitable material which is a poor conductor of heat and about this body fits a sleeve 25 formed of plastic high tensile strength. A chamber 26 extends longitudinally in the handle and from the rear end of this chamber extends a passage 27 to accommodate a power cable 28, the rear end of the handle body and its cover 25 being reinforced by a metal thimble 29 which fits into the extended rear end portion of the cover and is secured therein by screws 30. The handle is also formed with a transversely extending opening 31 into one end portion of which is driven a plug 32 having engagement with the cable to prevent the cable from being torn loose if subjected to outward pull. The handle is also formed with a side opening near its front end through which is mounted a switch 33 and the sleeve is formed with a slot 34 leading from its front end to accommodate the switch and allow the sleeve to be slid forwardly into place about the handle body. The wires 28' of the power cable are connected with the terminal 9' and one terminal of the switch and the other terminal of the switch is connected with the terminal 14' by a conductor wire 35 which may be a strand of wire cut from one of the wires 28'. When the switch is closed current flows through the resistance coils and this causes the tip to be heated. The tip has an improved thermal efficiency due to the exceptionally short heat conduction space between the source of heat and the heating surface. In addition, the relatively thin wall thickness of the active nickel shell overcomes its poorer heat conductivity in comparison to copper. The best efficiency can be achieved when the wall thickness of the shell is less than 30% of the shortest diameter measured cross section of the tip.

A collar 36 which is formed of high heat insulating material is secured about the front end of the handle by screws 37 and to this collar a disk 38 of greater diameter than the collar is secured by screws 39. The disk is formed of high heat insulating plastic and its center opening and the chamber 26 with which it registers are of such diameter that the rear end portion of the tubular tip holder 2 will be spaced therefrom when fitted into the handle. A metal flange or disk 40 is spaced forwardly from the rear end of the tube 2 and through this disk are passed screws 41 which carry spacer sleeves 42 and are passed through the disk 38 and engaged in threaded sockets formed in the collar 36. The spacers are formed of ceramic or other suitable high heat insulating materials and the screws are formed of metal having a lower heat conductivity than steel or iron. The soldering iron may, therefore, be conveniently held by its handle without inconvenience when it is in use and its tip will be quickly heated to a desired temperature when the switch is closed. As the switch is located near the front end of the handle it may be readily operated by the thumb of the hand grasping the handle.

From the foregoing description of the construction of my improved device, the operation thereof and the method of assembly will be readily understood, and it will be seen that I have provided a comparatively simple, inexpensive and efficient means for carrying out the various objects of the invention.

While I have particularly described the elements best adapted to perform the functions set forth, it is apparent that various changes in form, proportion and in the minor details of construction may be resorted to, without departing from the spirit or sacrificing any of the principles of the invention.

Having thus described the invention, what is claimed is:

1. In an electrically energized soldering iron, a handle, a tubular tip holder projecting forwardly from said handle, a tip mounted in said holder and projecting forwardly therefrom, said tip being flat in cross section and of appreciably greater width than thickness and including a shell formed of thin metal and having a closed and pointed front end, a lining for the forward portion of said shell formed of a solid metal which fuses on heating the tip to a soldering temperature, a sleeve of insulation in said shell surrounded by and having close fitting engagement with said liner, a core of insulating material extending longitudinally in said sleeve axially thereof and having a bore leading from its rear end, a body of insulation fitting in the rear portion of said shell and having its front end surrounding the rear end of said sleeve and abutting the rear end of the lining and being formed with a bore aligned with the bore of said core, an electrode extending longitudinally in the bores of the core and the body, front and rear coils surrounding the core and the body and connected in series, the front coil having its front end connected with the front end of said electrode, and power wires extending longitudinally through said handle and said tip holder and being one connected with the electrode and the other with the rear coil.

2. In an electric soldering iron, a hollow handle, a tubular tip holder projecting forwardly from said handle, a tip projecting forwardly from said tip holder, said tip having an elongated metal shell closed at its front end, a lining for said shell formed of a solid metal which fuses on heating the tip to a soldering temperature, a core extending longitudinally in said shell and formed with a longitudinal bore, a sleeve of insulation surrounding said core and having close fitting engagement with said lining, a body of insulation fitting into the rear portion of said shell and about the rear end of the sleeve, an electrode extending longitudinally through said body and fitting into the bore of said core, a heating coil about said core surrounded by said sleeve and having its front end connected with said electrode, and power wires extending longitudinally through the handle and the tip holder and connected with the electrode and the coil.

ALEXANDER SCHOENWALD.

(References on following page)

REFERENCES CITED

The following references are of record in the file of this patent:

UNITED STATES PATENTS

| Number | Name | Date |
|---|---|---|
| 10,944 | Weston | July 17, 1888 |
| 563,715 | Grutting | July 7, 1896 |
| 1,229,704 | Berry | June 12, 1917 |
| 1,231,749 | Kuhn | July 3, 1917 |
| 1,378,324 | Clark et al. | May 17, 1921 |
| 1,520,913 | Simon | Dec. 30, 1924 |
| 1,525,512 | Post | Feb. 10, 1925 |
| 1,602,266 | Jarkovsky | Oct. 5, 1926 |
| 1,379,721 | Rapelye | May 31, 1921 |
| 1,826,933 | Hazlett et al. | Oct. 13, 1931 |
| 1,988,827 | Bennett | Jan. 22, 1935 |
| 2,049,089 | Stackhouse | July 28, 1936 |
| 2,224,583 | Abbott | Dec. 10, 1940 |
| 2,257,376 | Grey | Sept. 30, 1941 |

FOREIGN PATENTS

| Number | Country | Date |
|---|---|---|
| 554,041 | Great Britain | June 17, 1943 |